United States Patent
Heinemann

(10) Patent No.: US 7,183,735 B2
(45) Date of Patent: Feb. 27, 2007

(54) DRIVE UNIT FOR CONTROLLING DRIVES IN MACHINE TOOLS OR PRODUCTION MACHINES

(75) Inventor: Gerhard Heinemann, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 19 days.

(21) Appl. No.: 10/841,940

(22) Filed: May 7, 2004

(65) Prior Publication Data

US 2004/0220685 A1 Nov. 4, 2004

(30) Foreign Application Priority Data

May 8, 2003 (DE) ................. 103 20 698

(51) Int. Cl.
*G05B 23/02* (2006.01)
(52) U.S. Cl. ............... 318/565; 318/569; 318/600; 318/625; 318/34; 318/39; 318/49; 361/42; 361/63; 361/93.1
(58) Field of Classification Search ............... 318/569, 318/600, 625, 34, 39, 49
See application file for complete search history.

(56) References Cited

U.S. PATENT DOCUMENTS

| | | | | |
|---|---|---|---|---|
| 5,422,808 A | * | 6/1995 | Catanese et al. ............ 700/79 |
| 5,767,844 A | * | 6/1998 | Stoye ...................... 345/212 |
| 5,781,028 A | * | 7/1998 | Decuir ..................... 326/30 |
| 6,260,084 B1 | * | 7/2001 | Wilson et al. ............... 710/38 |
| 6,725,318 B1 | * | 4/2004 | Sherman et al. ............. 710/313 |
| 6,831,551 B2 | * | 12/2004 | Davenport et al. ..... 340/310.06 |
| 6,906,983 B2 | * | 6/2005 | Williams et al. ............. 368/10 |
| 2003/0163714 A1 | * | 8/2003 | Nortung ................... 713/189 |

FOREIGN PATENT DOCUMENTS

| | | |
|---|---|---|
| DE | 101 27 722 A1 | 3/2002 |
| DE | 102 41 191 A1 | 4/2003 |

* cited by examiner

*Primary Examiner*—Lincoln Donovan
*Assistant Examiner*—Erick Glass
(74) *Attorney, Agent, or Firm*—Henry M. Feiereisen

(57) ABSTRACT

A drive unit for controlling drives of machine tools or production machines includes a signal electronics unit, a startup/diagnostic unit, and an interface between the signal electronics unit and the startup/diagnostic unit. The interface has a data line for data exchange between the signal electronics unit and the startup/diagnostic unit, and an electric power line independent of the data line. A switch can be provided that disconnects the signal electronics unit from a power mains or from an additional power supply, when a power failure is detected, and connects the signal electronics unit to the startup/diagnostic unit via the electric power line. This provides a simple and cost-effective approach for supplying electric power to the signal electronics in the event of a power failure or malfunction of the main power feed to the drive unit.

4 Claims, 3 Drawing Sheets

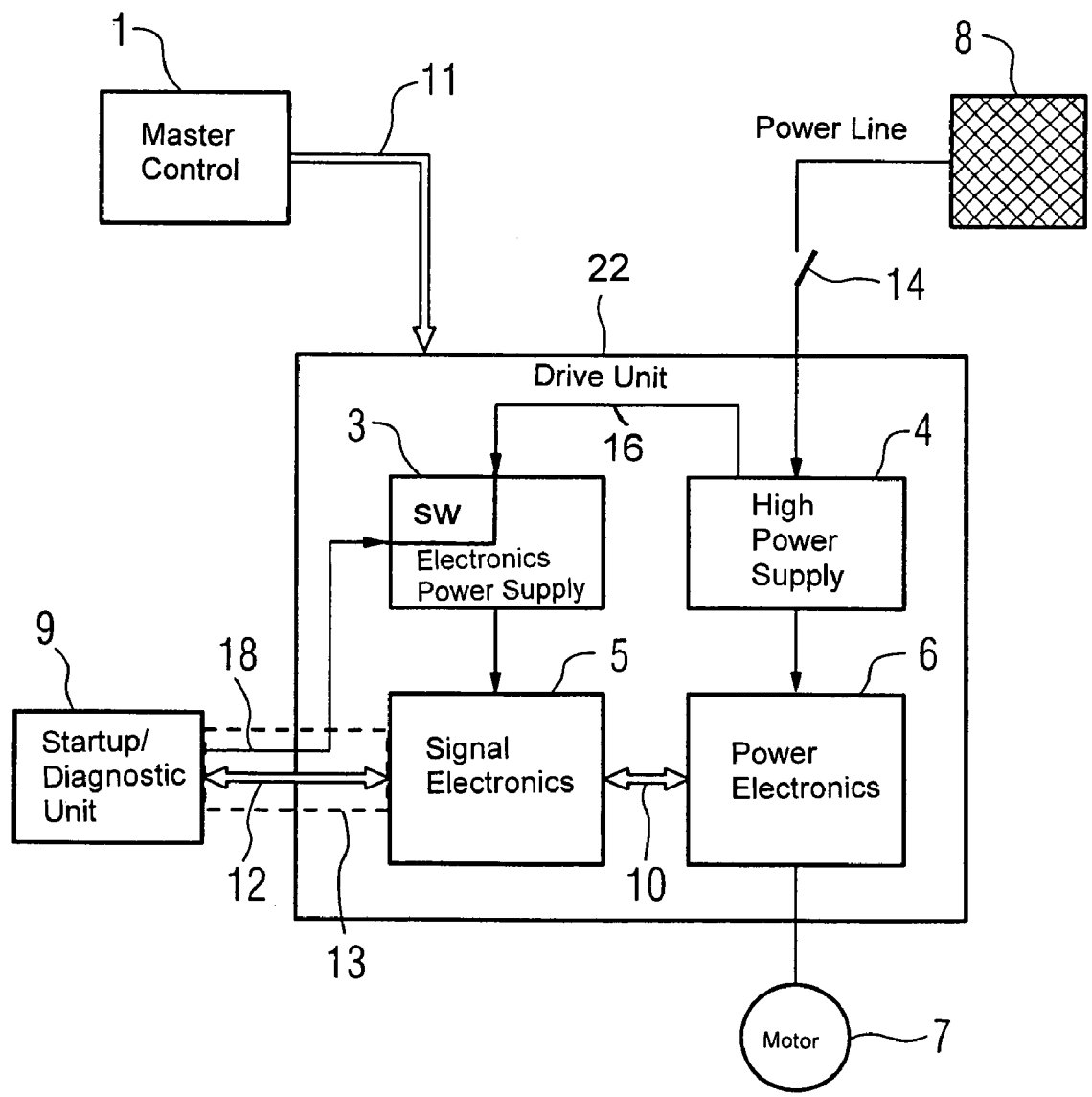

DRIVE UNIT FOR CONTROLLING DRIVES IN MACHINE TOOLS OR PRODUCTION MACHINES

CROSS-REFERENCES TO RELATED APPLICATIONS

This application claims the priority of German Patent Application, Serial No. 103 20 698.1, filed May 8, 2003, pursuant to 35 U.S.C. 119(a)–(d), the disclosure of which is incorporated herein by reference.

BACKGROUND OF THE INVENTION

The present invention relates to a drive unit for controlling drives of machine tools or production machines. Drives of machine tools or production machines are typically controlled by drive units which are commercially available. Typically, a drive unit that controls the drive is associated with each drive of the machine, which can be, for example, a motor with a connected gear and a load. One drive unit can also control several drives or motors.

FIG. 1 shows a conventional drive unit 2 and a number of components that are typically connected to the drive unit 2. A master control 1 transmits via a connection 11 to the drive unit 2 certain desired parameter values that control a motor 7 of the drive of the machine, such as the motor 7. The control functions for the motor 7 are implemented in signal electronics 5 which is controlled by a microprocessor (not shown) executing software. The signal electronics 5 reads the desired parameter values from a master controller 1 and receives, for example, transducer signals (not shown) from the motor 7 and determines therefrom control signals for a power electronics 6, which are then transmitted to the power electronics 6 via a connection 10. The power electronics 6 is essentially composed of a converter or an inverter, which provides power to the motor 7 and controls the motor. The drive unit 2 also includes an electronic power supply 3 that supplies power to the signal electronics, and a high power supply 4 that supplies power to the power electronics 6. The high power supply 4 derives its power from a power mains 8. The high power supply 4 also supplies power to the electronic power supply 3 via connection 16. The electronic power supply 3 supplies electric power to the signal electronics 5, whereas the high power supply 4 supplies electric power to the power electronic 6, as indicated by corresponding connections 17 and 19, respectively.

The drive unit 2, in particular the signal electronics 5, can be parameterized or initialized by a startup/diagnostic unit 9, and a diagnostic test can be performed when the drive unit malfunctions. The startup/diagnostic unit 9 is connected with the signal electronics 5 via a startup/diagnostic interface 20, which consists exclusively of data lines 12, for data exchange.

FIG. 2 shows another embodiment of a conventional drive unit 2. Identical elements or elements performing an identical function are designated with the same reference characters as the elements in FIG. 1. The embodiment of FIG. 2 is identical to the embodiment of FIG. 1, except that the electronic power supply 3 has here a dedicated separate connection to the power mains 8 controlled by a dedicated switch 15. The electronic power supply 3 is therefore supplied with electric power from a separate power feed, i.e. the power mains 8, which disadvantageously requires an additional interface for the drive unit 2 in FIG. 2.

Accordingly, the commonly used conventional drive units derive their electric power for the electronics either directly from the high power supply 4 (as shown in the prior art drive unit 2 of FIG. 1) or from a separately switchable power feed controlled by switch 15 (as shown in the prior art drive unit 2 of FIG. 2). In the first case, depicted in FIG. 1, the drive unit 2 can communicate with the startup/diagnostic unit 9 only when the high power supply 4 is electrically connected with the power mains 8. In the second case, depicted in FIG. 2, the drive unit 2 can communicate with the startup/diagnostic unit 9 also when the high power supply 4 is switched off, i.e. disconnected from the power mains 8. However, a second connection to the power mains 8 is then required, which may make particularly low-power devices too expensive. In addition, with both conventional embodiments, a power mains 8 must be available.

It would therefore be desirable and advantageous to provide an improved system for supplying electric energy to the signal electronics of a drive unit via a suitable startup/diagnostic interface in a simple and cost-effective manner, which obviates prior art shortcomings and is able to specifically supply electric power without requiring a connection to a power line.

SUMMARY OF THE INVENTION

According to one aspect of the present invention, a drive unit for controlling one or more drives of machine tools or production machines includes a signal electronics unit, a startup/diagnostic unit, and an interface between the signal electronics unit and the startup/diagnostic unit. The interface includes a data line for data exchange between the signal electronics unit and the startup/diagnostic unit, and an electric power line independent of the data line. The electric power line supplies electric power from the startup/diagnostic unit to the signal electronics unit.

In an advantageous embodiment of the invention, the startup/diagnostic interface can include a USB interface, a FireWire interface or a Drive-Cliq interface. The drive unit can further include a switch that disconnects the signal electronics unit from a power mains or from an additional power supply, when a power failure is detected, and connects the signal electronics unit to the startup/diagnostic unit via the electric power line. In an alternative embodiment, data can also be exchanged via the electric power line, without the need for a dedicated data line.

The device of the invention advantageously eliminates the need for a second separately switched connection between the power line and the electronic power supply, which lowers the hardware and wiring costs for the drive unit. In addition, drive units whose electronic power supply is powered from the high power supply, can be parameterized and diagnosed even if the high power supply is disconnected from the power line. This is of interest from a safety aspect, because switching the high power supply on may potentially also cause machine components to be switched on. Moreover, the drive unit can be parameterized and diagnosed before the wiring in the control cabinet of the machine is completed.

If necessary, a user can parameterize the units before they are installed in the cabinet and even before they are removed from inventory. An on-site startup/diagnostic unit for starting up the machine becomes then unnecessary.

Diagnostic tests can still be performed on the drive unit even if the power mains fails, for example due to a tripped fuse.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a block circuit diagram of a drive unit according to the present invention with a diagnostic unit and connected signal and power electronics.

DETAILED DESCRIPTION OF PREFERRED EMBODIMENTS

Figure 1:
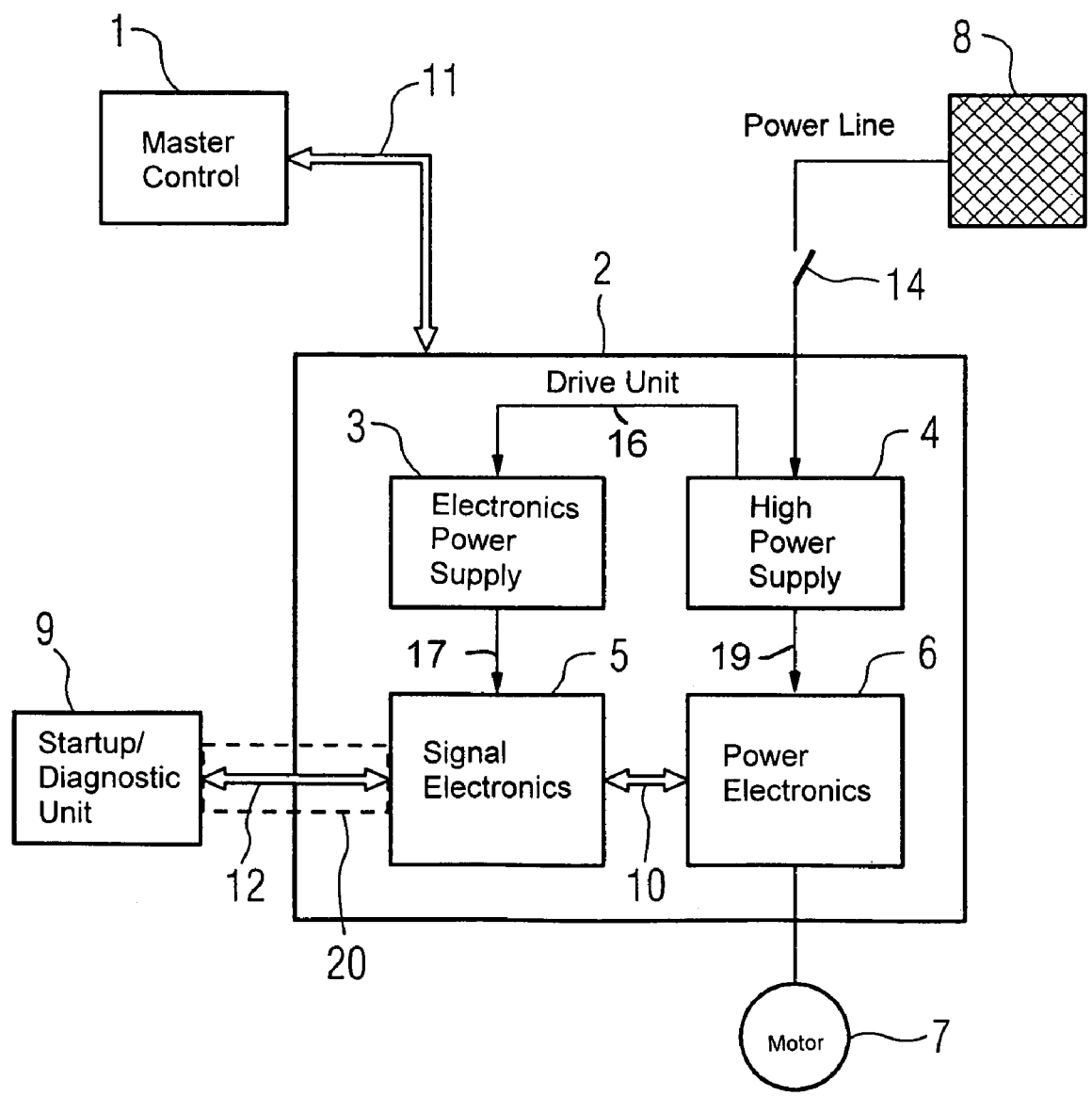
FIG. 1 is a block circuit diagram of a conventional drive unit with connected signal and power electronics.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 3, there is shown in form of a block circuit diagram a drive unit 22 according to the invention. Components of drive unit 22 depicted in FIG. 3 that are substantially identical to those of FIGS. 1 and 2 and/or perform a substantially identical function are designated with the same reference characters. The startup/diagnostic interface 13 between the startup/diagnostic unit 9 and the drive unit 22 depicted in FIG. 3, unlike the interface 20 shown in FIGS. 1 and 2, includes both data lines 12 and power lines 18 for supplying electric power, wherein the power lines 18 are separate from and electrically independent of the data lines 12. As mentioned above, the startup/diagnostic interface 20 in the drive unit 2 of FIGS. 1 and 2 includes only data lines 12. The data lines 12 are provided for diagnostic tests and for starting up the drive unit 22 and enable data exchange between the startup/diagnostic unit 9 and the drive unit 22, in particular the signal electronics 5. The startup/diagnostic unit 9 can be implemented, for example, in form of a conventional personal computer or laptop computer. Electric power can be supplied from the electronic power supply 3 to the signal electronics 5 via the power lines 18 independent of the power mains 8 or the high power supply 4.

According to the invention, the startup/diagnostic unit 9 supplies herein the power to the electronic power supply 3 which in turn powers the signal electronics 5. The supply lines 18 consists typically of two wires with, for example, for DC operation, positive and negative polarity. However, the signal electronics 5 can also be powered with an AC voltage.

More particularly, the startup/diagnostic interface 13 can be implemented with state-of-the-art digital interfaces, such as USB (Universal Serial Bus), FireWire (IEEE 1394) or Drive-Cliq (available from Siemens Corp., Germany). These digital interfaces include not only data lines 12, but have also integrated power lines 18 that can supply power to, for example, low-power peripheral devices. This situation exists for the electronic power supply of drive units. For example, an electronic switch can be used to selectively supply power to the signal electronics 5 of drive units either from the high power supply 4 via connection 16 or from the startup/diagnostic interface 13 via power lines 18.

Figure 2:
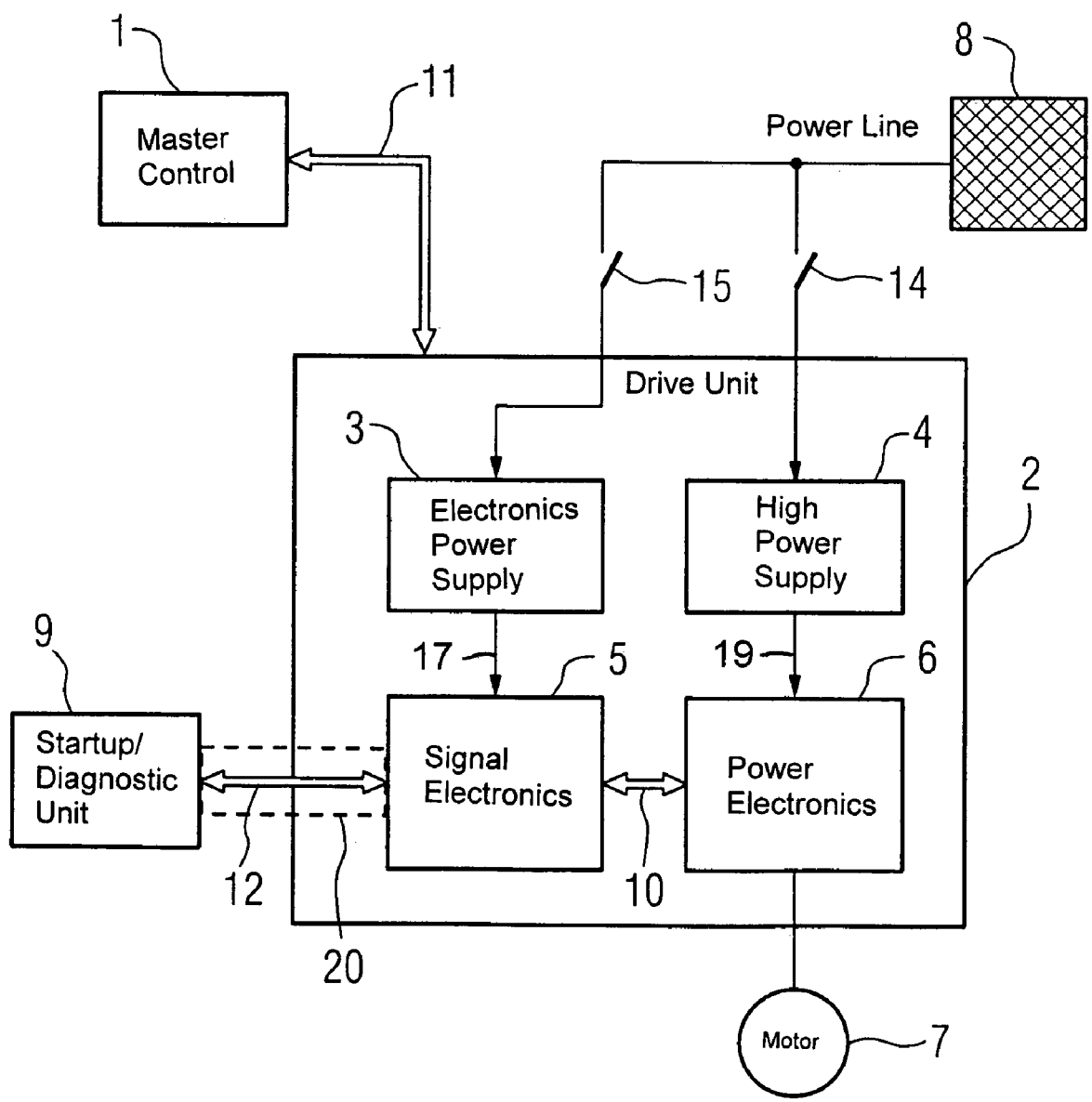
FIG. 2 is a block circuit diagram of another conventional drive unit with connected signal and power electronics.

The conventional startup/diagnostic interface 20 according to FIG. 2 is typically implemented as a Profibus interface, which only includes the data lines 12 and lacks the additional power lines 18 for supplying power to the signal electronics 5.

An automatic electronic switch SW, e.g., an FET, can be incorporated, for example in the power supply 3. The switch SW can switch the supply voltage for the electronics power supply 3 between the high power supply 4 (power supplied via connection 16) and the startup/diagnostic unit 9 (power supplied via power lines 18), as soon as it is detected that neither the power mains 8 nor the high power supply 4 are supplying power to the signal electronics 5.

It will be understood by those skilled in the art that the electronic power supply 3 in FIGS. 1 and 3 can also be implemented separately from the power electronics 4. For example, the electronic power supply 3 in the drive unit 2 can be connected to the power mains 8 parallel to the power electronics 4 via the single power line. This approach, however, would add complexity to the electronic power supply 3 and a dedicated isolation transformer may have to be provided. Moreover, if the main power line fails, then the signal electronics would also be without power.

In an alternative embodiment, dedicated data lines 12 and power lines 18 may not have to be provided. For example, the data can also be modulated on the power lines 18.

It should be noted here that machine tools include single-axis or multi-axes lathes, milling machines, drilling machines or grinding machines. Machine tools also include processing centers, linear and rotary transfer machines, laser machines or rolling and gear-making machines. All these machines have in common, that a material is machined, optionally along multiple axes. Production machines also include, for example, textile, plastics, wood, glass, ceramics or rock processing machines. Production machines also include machines for forming and packaging, printing or conveying, as well as pumps, fans, lifting gear and robots.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive unit for controlling one or more drives of machine tools or production machines, comprising:
   a signal electronics unit connected to and receiving electric power from a power supply;
   a startup/diagnostic unit embodied as a conventional personal computer (PC); and
   an interface between the signal electronics unit and the PC,
   wherein the interface comprises a data line for data exchange between the signal electronics unit and the PC, and an electric power line independent of the data line, said electric power line supplying electric operating power from the PC to the signal electronics unit for operating the signal electronics unit if the power supply fails to supply the electric power to the signal electronics.

2. The drive unit of claim 1, wherein the PC interface comprises a USB interface, a FireWire interface or a Drive-Cliq interface.

3. The drive unit of claim 1, further comprising a switch that disconnects the signal electronics unit from a power mains or from an additional power supply, when a power failure is detected, and connects the signal electronics unit to the PC via the electric power line.

4. The drive unit of claim 1, wherein the data exchange occurs via the electric power line.

* * * * *